(12) United States Patent
Kanayama et al.

(10) Patent No.: US 11,567,241 B2
(45) Date of Patent: Jan. 31, 2023

(54) LIGHT PROJECTION LENS AND MOBILE OBJECT

(71) Applicant: PANASONIC INTELLECTUAL PROPERTY MANAGEMENT CO., LTD., Osaka (JP)

(72) Inventors: Yoshihiko Kanayama, Hyogo (JP); Atsushi Fukui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 390 days.

(21) Appl. No.: 16/748,199

(22) Filed: Jan. 21, 2020

(65) Prior Publication Data
US 2020/0241176 A1 Jul. 30, 2020

(30) Foreign Application Priority Data
Jan. 29, 2019 (JP) ............................. JP2019-013049

(51) Int. Cl.
*G02B 3/04* (2006.01)
*B60R 11/04* (2006.01)
(Continued)

(52) U.S. Cl.
CPC ................ *G02B 3/04* (2013.01); *B60Q 1/24* (2013.01); *B60R 11/04* (2013.01); *H04N 5/33* (2013.01);
(Continued)

(58) Field of Classification Search
CPC .... G02B 3/04; G02B 2003/0093; B60Q 1/24; B60R 11/04; B60R 2011/004; H04N 5/33
(Continued)

(56) References Cited

U.S. PATENT DOCUMENTS 6,473,238 B1 * 10/2002 Daniell ................ G02B 3/0075
348/E13.043
2015/0260943 A1 * 9/2015 Yan ........................ G02B 7/021
359/771
(Continued)

FOREIGN PATENT DOCUMENTS

CN 206656250 U 11/2017
JP 2015-071386 A 4/2015
WO WO-2014005972 A1 * 1/2014 ............. B60K 35/00

OTHER PUBLICATIONS

Chinese Office Action (including English Language Search Report), dated Aug. 17, 2021, for the Chinese Patent Application No. 202010021165.2.

*Primary Examiner* — Marin Pichler
*Assistant Examiner* — Mitchell T Oestreich
(74) *Attorney, Agent, or Firm* — Greenblum & Bernstein, P.L.C.

(57) ABSTRACT

A light projection lens includes: an inner surface which light emitted from a light source enters, and includes a first concave portion; and an outer surface from which the light exits. In a cross section parallel to an optical axis of the light emitted from the light source, the outer surface and the first concave portion have a difference in radius of curvature in at least a portion of the outer surface and the first concave portion. In a cross section perpendicular to the optical axis of the light emitted from the light source, the first concave portion has an elliptical shape. The light which exits from the outer surface is lesser in amount in an optical axis direction of the light emitted from the light source than in a direction different from the optical axis direction.

14 Claims, 5 Drawing Sheets

(51) Int. Cl.
*H04N 5/33* (2006.01)
*B60Q 1/24* (2006.01)
*B60R 11/00* (2006.01)
*G02B 3/00* (2006.01)

(52) U.S. Cl.
CPC . *B60R 2011/004* (2013.01); *G02B 2003/0093* (2013.01)

(58) Field of Classification Search
USPC .......................................................... 359/356
See application file for complete search history.

(56) References Cited

U.S. PATENT DOCUMENTS

2016/0054175 A1* 2/2016 Jia .......................... G01J 1/0233
250/216
2018/0340672 A1* 11/2018 Kim .......................... F21K 9/64

\* cited by examiner

LIGHT PROJECTION LENS AND MOBILE OBJECT

CROSS REFERENCE TO RELATED APPLICATION

This application claims the benefit of priority of Japanese Patent Application Number 2019-013049, filed on Jan. 29, 2019, the entire content of which is hereby incorporated by reference.

TECHNICAL FIELD

The present disclosure relates to a light projection lens and a mobile object that includes the light projection lens.

BACKGROUND ART

Conventionally, lighting equipment provided for a mobile object, such as a vehicle, which emits light toward a road surface around the mobile object has been known (for example, Japanese Unexamined Patent Application Publication No. 2015-71386).

For example, Japanese Unexamined Patent Application Publication No. 2015-71386 discloses lighting equipment which is provided in a side-view mirror for illuminating around a passenger's feet outside a vehicle.

SUMMARY

Technical Problem

Conventional lighting equipment, for example, lighting equipment provided for a mobile object, such as a vehicle, which emits light for illuminating a road surface, is expected to uniformly illuminate the road surface. In addition, when the lighting equipment is provided in a side-view mirror of the mobile object and illuminates the road surface alongside the mobile object, the shape of a spot on an illumination surface, such as the road surface, where the lighting equipment is illuminating is expected to be long, since the mobile object has an elongated shape in a direction parallel to a traveling direction of the mobile object.

The present disclosure provides a light projection lens and the like which enable light emitted from a light source to have, on a spot on an illumination surface where the light illuminates, a long shape and the intensity of light that is uniform.

Solution to Problem

A light projection lens according to an aspect of the present disclosure includes: an inner surface which light emitted from a light source enters, and includes a first concave portion hollowed in a direction in which the light emitted from the light source enters; and an outer surface from which the light that has entered the inner surface exits, wherein in a cross section parallel to an optical axis of the light emitted from the light source, the outer surface and the first concave portion included in the inner surface have a difference in radius of curvature in at least a portion of the outer surface and the first concave portion, in a cross section perpendicular to the optical axis of the light emitted from the light source, the first concave portion has an elliptical shape, and the light which exits from the outer surface is lesser in amount in an optical axis direction of the light emitted from the light source than in a direction different from the optical axis direction.

In addition, a mobile object according to an aspect of the present disclosure includes: the light source which emits infrared light; the light projection lens which covers the light source, and includes: the inner surface which the infrared light emitted from the light source enters; and the outer surface from which the infrared light exits; and a camera capable of detecting the infrared light that has exited from the light projection lens.

Advantageous Effects

A light projection lens and the like according to the present disclosure enable light emitted from a light source to have, on a spot on an illumination surface where the light illuminates, a long shape and the intensity of light that is uniform.

BRIEF DESCRIPTION OF THE DRAWINGS

The figures depict one or more implementations in accordance with the present teaching, by way of examples only, not by way of limitations. In the figures, like reference numerals refer to the same or similar elements.

DETAILED DESCRIPTION

Hereinafter, embodiments according to the present disclosure will be described with reference to the drawings. Note that the embodiments described below each show a general or specific example. The numerical values, shapes, materials, structural elements, the arrangement and connection of the structural elements, and the like described in the following embodiments are mere examples, and thus are not intended to limit the present disclosure. In addition, among the structural elements in the following embodiments, structural elements not recited in any of the independent claims defining the most generic part of the inventive concept are described as optional structural elements.

Note that the drawings are schematic diagrams, and do not necessarily provide strictly accurate illustration. The structural elements in these schematic diagrams are optionally emphasized and omitted, and proportionally adjusted to indicate the present disclosure. Therefore, the structural elements may be different from their actual shapes, positional relationships, and proportions. Throughout the drawings, the same reference signs are given to substantially the same structural elements, and redundant descriptions may be omitted or simplified.

Furthermore, the Z-axis direction is, for example, a vertical direction. The positive direction of the Z-axis may be indicated as up, and the negative direction of the Z-axis may be indicated as down in the embodiments. The Y-axis direction and the X-axis direction are mutually orthogonal in a plane (horizontal plane) perpendicular to the Z-axis. The Y-axis direction may be indicated as a side of a mobile object. The X-axis direction may be indicated as a direction in which the mobile object travels (traveling direction).

In addition, an expression which indicates a direction, such as a "horizontal direction", may be used in the following embodiments. In this case, "the horizontal direction" includes not only a case in which the direction is perfectly horizontal, but also includes a case that includes a deviation of about several percent caused during manufacturing and installation.

Furthermore, an expression which indicates a relationship, such as "to coincide with", may be used in the following embodiments. In this case, "to coincide with" not only includes a case in which a thing perfectly coincides with the other, but also includes a case that includes a deviation of about several percent caused during manufacturing and installation.

Embodiment

[Configuration]

Figure 1:
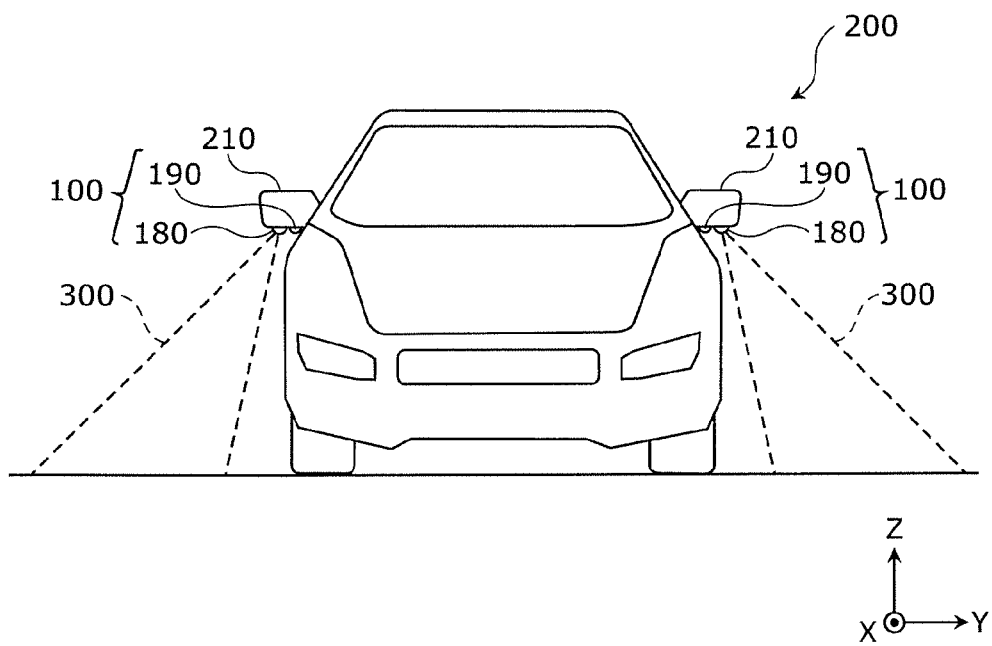
FIG. 1 is a front view of a mobile object according to an embodiment.
Figure 2:
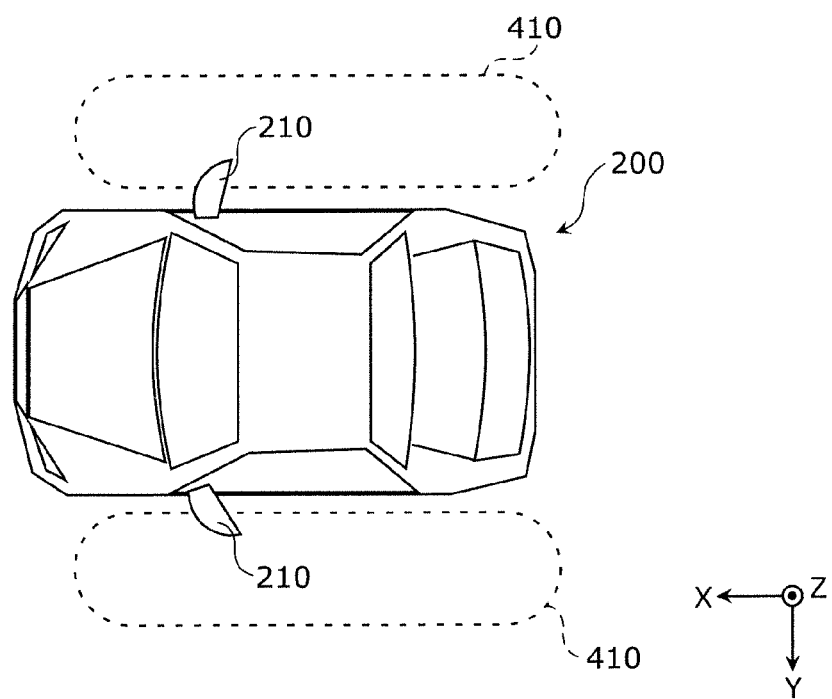
FIG. 2 is a top view of the mobile object according to the embodiment.
Figure 3:
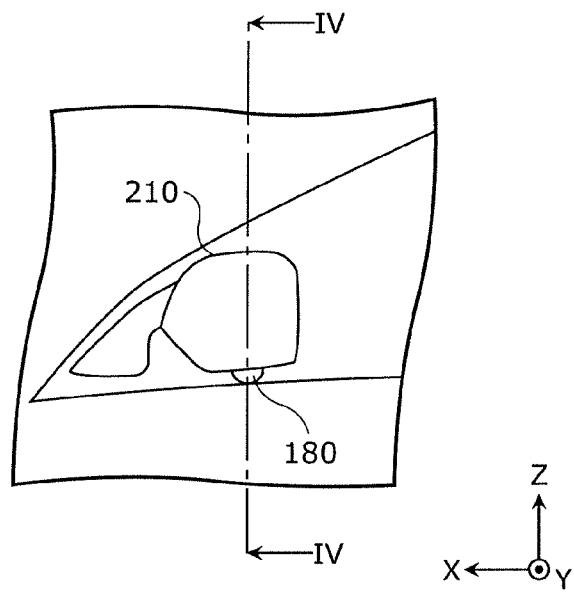
FIG. 3 is an enlarged side view of a side-view mirror which the mobile object according to the embodiment includes.
Figure 4:
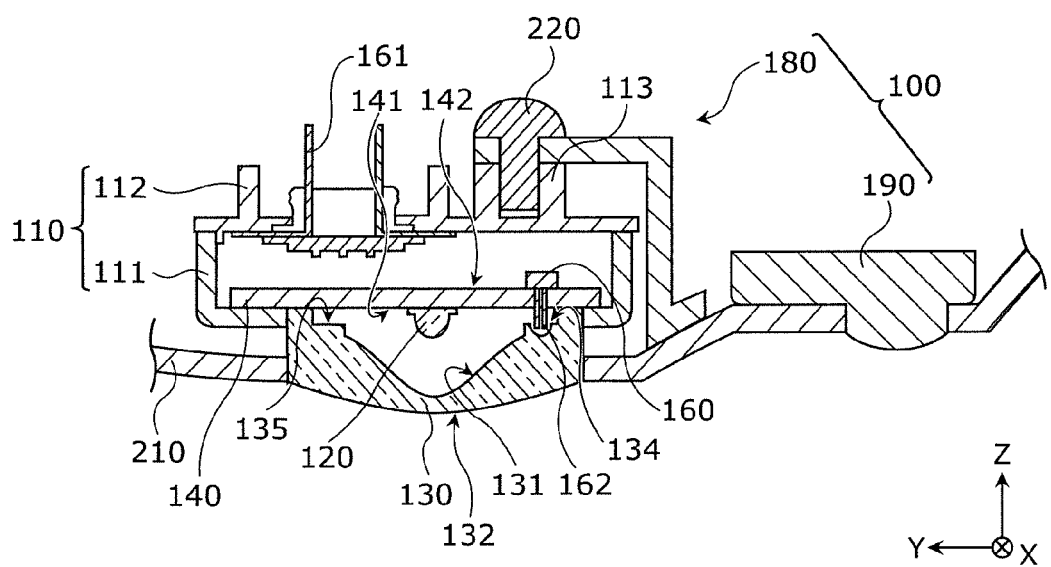
FIG. 4 is a cross sectional view of a light projection lens according to the embodiment taken along the IV-IV line illustrated in FIG. 3.

FIG. 1 is a front view of mobile object 200 according to an embodiment. FIG. 2 is a top view of mobile object 200 according to the embodiment. FIG. 3 is an enlarged side view of side-view mirror 210 which mobile object 200 according to the embodiment includes. FIG. 4 is a cross sectional view of light projection lens 130 according to the embodiment taken along the IV-IV line illustrated in FIG. 3.

Light projection lens 130 according to the embodiment is an optical element which is provided for mobile object 200, such as a vehicle, a motorcycle, and a bicycle. Light projection lens 130 controls a light distribution characteristic of light (infrared light) 300 which is emitted from light source 120 toward a road surface around mobile object 200.

Mobile object 200 includes light source unit 100 which includes: light source 120; light projection lens 130 which covers light source 120; and camera 190. Mobile object 200 according to the embodiment includes light source unit 100 which is provided in side-view mirror 210. Side-view mirror 210 is provided on each of the two sides of mobile object 200.

Mobile object 200 includes light source unit 100 on the outside (outer surface) of mobile object 200. Specifically, mobile object 200 includes light source unit 100 attached in a position outside of or near the body of mobile object 200 in a horizontal direction which includes the front and the back and the sides of the body, and in a position where light source 120 (see FIG. 4) included in light source unit 100 can emit light 300 on a road surface around mobile object 200 when light source 120 emits light 300 downward. In the embodiment, light source unit 100 is provided in side-view mirror 210 of mobile object 200. More specifically, light source unit 100 is disposed at the bottom of side-view mirror 210.

Note that although mobile object 200 illustrated in FIG. 1 includes light source unit 100 in each of the two side-view mirrors 210, mobile object 200 may include a single light source unit 100 in one of the two side-view mirrors 210.

In addition, the outside of mobile object 200 not only indicates the outer surface of mobile object 200 in the horizontal direction which includes the front and the back and the left and the right of mobile object 200, but also includes outer surfaces of the sides of the body, such as a side face of side-view mirror 210, a bottom face of side-view mirror 210, and an outer face of a door which mobile object 200 includes. In addition, mobile object 200 having light source unit 100 on the outside not only includes a case in which light source unit 100 is disposed on the outside of mobile object 200, but also includes a case in which light source unit 100 is disposed near the outside of mobile object 200 which includes the inside of mobile object 200.

Mobile object 200 in the embodiment has an elongated shape in the X-axis direction when seen from the top. In other words, mobile object 200 is long in a traveling direction of mobile object 200.

Light source unit 100 is included in mobile object 200, and emits light 300 towards a road surface around mobile object 200. Light 300 which light source unit 100 emits is infrared light, for example. Light source unit 100 emits light 300 to capture an image of a road surface around mobile object 200 with camera 190 which can detect infrared light. Specifically, light source unit 100 emits infrared light so that camera 190 can capture an image of the road surface even at night and the like when there is not enough ambient light.

Light source unit 100 includes light source section 180 and camera 190.

Light source section 180 includes case 110, light source 120, light projection lens 130, substrate 140, and terminals 160 and 161.

Case 110 is a case for supporting light source 120. Case 110 includes container 111 and cover 112, for example.

Container 111 has a box-like body which houses and supports light source 120. Container 111 has an opening formed in the top, and cover 112 is disposed so as to cover the opening.

Cover 112 is a lid for covering the opening formed in the top of container 111. Case 110 includes attachment 113 to be attached to mobile object 200. More specifically, attachment 113 is formed on cover 112.

Attachment 113 is a connecting portion used for attaching light source section 180 to mobile object 200 (more specifically, side-view mirror 210). Attachment 113 includes, for example, a threaded hole into which screw 220 is screwed. Light source unit 100 is attached to mobile object 200 with screw 220 fastened to attachment 113.

A material used for case 110 is not particularly limited, but a resin material, such as acrylic or polycarbonate, or a metallic material is used, for example. Note that container 111 and light projection lens 130 may be formed using the same material, or different materials.

Figure 5:
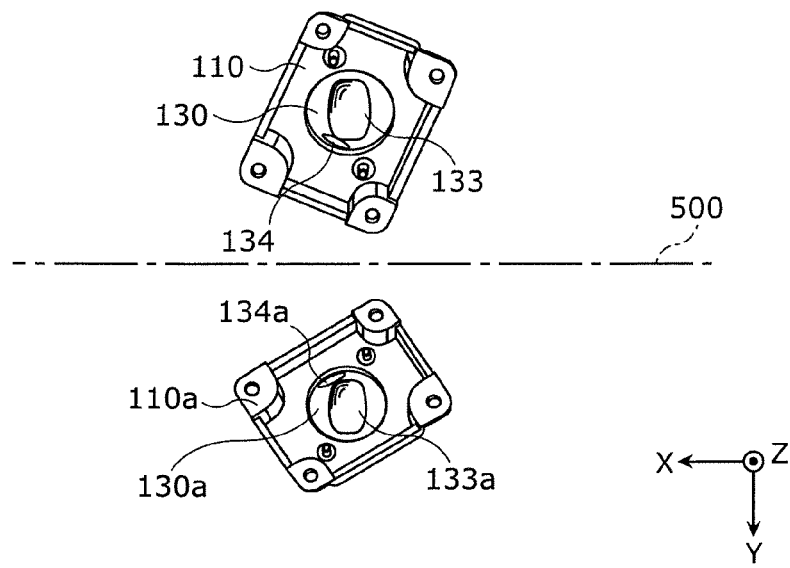
FIG. 5 is a schematic top view of cases attached to the mobile object according to the embodiment.

FIG. 5 is a schematic top view of cases 110 which are attached to mobile object 200 according to the embodiment. Specifically, FIG. 5 is a schematic top view of the two side-view mirrors 210 provided for mobile object 200. Each of the two side-view mirrors 210 includes either light projection lenses 130 and 130a, and either cases 110 and 110a.

Note that a light projection lens and a case in the negative direction of the Y-axis are light projection lens 130 and case 110, respectively, and a light projection lens and a case in the positive direction of the Y-axis are light projection lens 130a and case 110a, respectively.

For example, when mobile object 200 is seen from the top as illustrated in FIG. 5, the two cases 110 and 110a which are arranged on respective sides of mobile object 200 are asymmetrical relative to imaginary line 500 which passes through the center of mobile object 200 as illustrated in FIG. 2, and is parallel to a traveling direction of mobile object 200, for example.

On the other hand, when mobile object 200 is seen from the top, two light projection lenses 130 and 130a which are arranged on the respective sides of mobile object 200 have line symmetry relative to imaginary line 500 which passes through the center of mobile object 200 as illustrated in FIG. 2, and is parallel to the traveling direction of mobile object 200, for example.

For example, first concave portion 133 and second concave portion 134 which light projection lens 130 includes, and first concave portion 133a and second concave portion 134a which light projection lens 130a includes have line symmetry relative to imaginary line 500.

Light source 120 is a light source which emits light 300. Light source 120 includes a solid-state semiconductor light source, such as a light emitting diode (LED). FIG. 4 schematically illustrates, as light source 120, an LED which is mounted on substrate 140, and emits light 300 in a state in which the LED is sealed with resin and the like.

In the embodiment, any light which light source 120 emits, and any light which exits from light projection lens 130 will be called light 300.

Light 300 is infrared light (near infrared) having the peak wavelength of at least 800 nm and at most 1000 nm, for example. Light 300 may be infrared light having the peak wavelength of at least 930 nm and at most 950 nm, for example.

Light projection lens 130 covers light source 120, and allows light 300 which light source 120 emits to pass through. Specifically, light projection lens 130 is an optical element which is disposed in case 110 so as to cover the lower part of light source 120. Light projection lens 130 controls the distribution of light 300 which light source 120 emits. In addition, outer surface 132 (the bottom face of light projection lens 130 in the embodiment) which is a surface of light projection lens 130 where light exits from is disposed such that outer surface 132 is exposed from the outer surface of mobile object 200, specifically, from the bottom face of side-view mirror 210. Furthermore, light projection lens 130 and light source 120 are spaced apart from each other.

Light projection lens 130 is made of a glass material or acrylic having light transmissivity (for example, light transmissivity which allows at least 90% of light 300 to pass through), or a resin material having light transmissivity, such as polycarbonate, for example.

In addition, light projection lens 130 has light transmissivity which allows passage of infrared light which is light 300 emitted from light source 120, but does not allow passage of visible light, for example. Specifically, light projection lens 130 allows passage of, for example, at least 80% of infrared light having the wavelength of at least 900 nm and at most 1000 nm, but does not allow passage of visible light having the wavelength of at least 400 nm and at most 780 nm (for example, at least 90% of the visible light is blocked). A material for light projection lens 130 which has such optical properties is exemplified by acrylic resin.

In addition, light source 120 and light projection lens 130 are attached to mobile object 200 such that the optical axis of light 300 which exits from light projection lens 130 is directed toward the rear of mobile object 200. For example, as illustrated in FIG. 2, light source 120 and light projection lens 130 are attached to mobile object 200 such that the center of spot 410 where light 300 illuminates will be positioned behind side-view mirror 210 to which light source 120 and light projection lens 130 are attached, or in other words, positioned in the negative direction of the X-axis. Light source 120 and light projection lens 130 may be disposed such that the optical axis of light 300 which light source 120 emits is directed toward the rear of mobile object 200, or mobile object 200 may further include an optical element that reflects or refracts light 300 which exits from light projection lens 130 so that the optical axis of light 300 is directed toward the rear of mobile object 200.

In addition, light source 120 and light projection lens 130 are attached to mobile object 200 such that the optical axis of light 300 which exits from light projection lens 130 may be directed away from mobile object 200, for example. As illustrated in FIG. 1, light source 120 and light projection lens 130 are attached to mobile object 200 such that light 300 is emitted toward a side of mobile object 200 rather than directly below side-view mirror 210 to which light source 120 and light projection lens 130 are attached. Light source 120 and light projection lens 130 may be disposed such that the optical axis of light 300 which is emitted from light source 120 is directed away from mobile object 200, or mobile object 200 may further include an optical element that reflects or refracts light 300 which exits from light projection lens 130 so that the optical axis of light 300 is directed away from mobile object 200.

Note that, in the embodiment, light source 120 and light projection lens 130 are disposed such that the center of light source 120 and the center of light projection lens 130 overlap each other, when light projection lens 130 is seen from the top. That is, light source 120 and light projection lens 130 are disposed such that the optical axis of light 300 emitted from light source 120 passes through the center (the center of inner surface 131 and the center of outer surface 132) of light projection lens 130.

The structure of light projection lens 130 will be described in detail later.

Substrate 140 is a substrate on which light source 120 is disposed. Specifically, light source 120 is mounted on substrate 140. Substrate 140 is in contact with an edge of light projection lens 130. Substrate 140 is also in contact with case 110. Substrate 140, case 110 (specifically, container 111 which the case includes), and light projection lens 130 are in direct contact with one another in the embodiment.

A material used for substrate 140 is not particularly limited, but a metallic substrate, a ceramic substrate, a resin substrate, or the like, is used, for example. Note that substrate 140 may be flexible or rigid.

Terminals 160 and 161 are terminals for supplying, to light source 120, electric power supplied from an external power source, for example. Terminal 160 and 161 are electrically connected using, for example, metallic wiring which is not illustrated.

In addition, terminal 160 includes pins 162 for electrically connecting with wiring formed on substrate 140. Note that the wiring is not illustrated. Pins 162 are, for example, soldered and attached to substrate 140.

In addition, pins 162 are disposed in a space formed in second concave portion 134 which inner surface 131 of light projection lens 130 includes.

Terminal 160 is provided so as to penetrate substrate 140 from back surface 142 of substrate 140 to mounting surface 141 of substrate 140 on which light source 120 is mounted.

Camera 190 is a device for capturing an image of a road surface around mobile object 200. Camera 190 captures an image of the road surface where light source 120 illuminates with light 300, for example. As described above, light source 120 is a light source which emits infrared light as light 300. Camera 190 detects light 300 emitted from light source 120, or specifically, light 300 emitted from light source 120 which is reflected off the road surface to capture an image of the road surface. Naturally, camera 190 may capture, without light 300, an image in daytime using ambient light in the visible range, such as sunlight.

Note that camera 190 may be disposed closer to mobile object 200 than light source 120 is. In the embodiment, camera 190 is disposed on the side of the negative direction of the Y-axis, and between light source 120 (specifically, light source section 180) and the body of mobile object 200. In this way, light source 120 is disposed away from mobile object 200, compared with a case in which light source 120 is disposed closer to mobile object 200 than camera 190 is. Accordingly, it is possible to reduce the loss of light 300 emitted from light source 120 due to light 300 striking mobile object 200.

Camera 190 includes an image sensor, such as a charge coupled device (CCD) image sensor and a complementary metal oxide semiconductor (CMOS) image sensor.

Next, the structure of light projection lens 130 will be described in detail with reference to FIG. 6 through FIG. 10.

Figure 6:
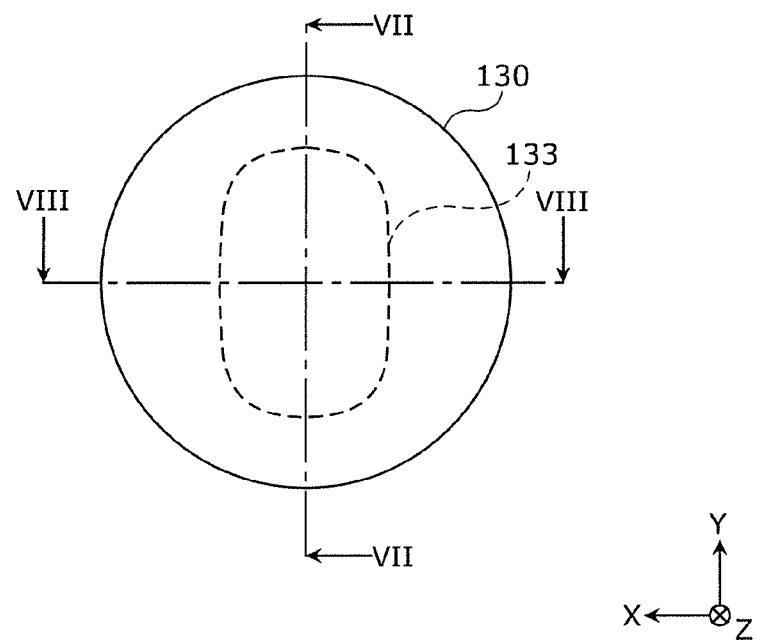
FIG. 6 is a bottom view of the light projection lens according to the embodiment.
Figure 7:
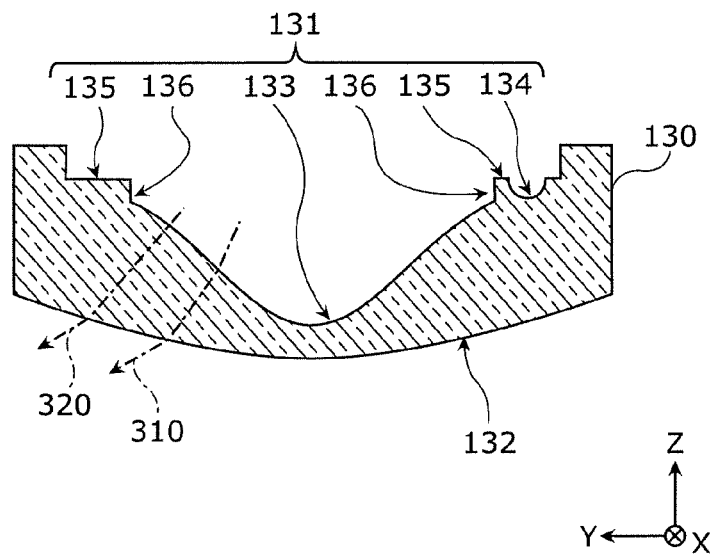
FIG. 7 is a cross sectional view of the light projection lens according to the embodiment taken along the VII-VII line illustrated in FIG. 6.
Figure 8:
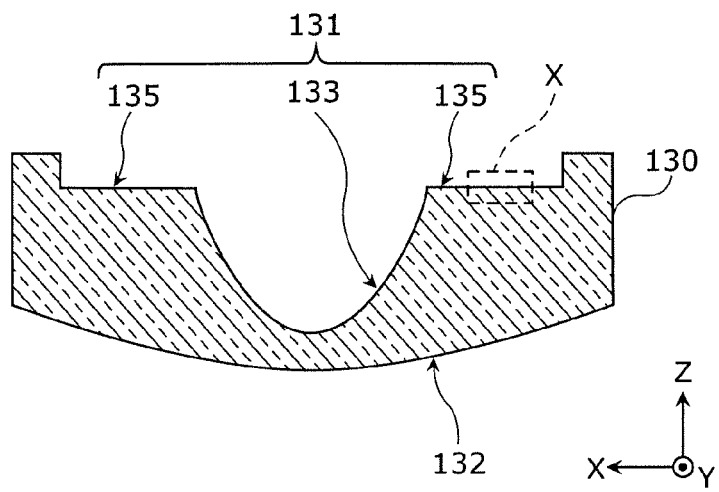
FIG. 8 is a cross sectional view of the light projection lens according to the embodiment taken along the VIII-VIII line illustrated in FIG. 6.

FIG. 6 is a bottom view of light projection lens 130 according to the embodiment. FIG. 7 is a cross sectional view of light projection lens 130 according to the embodiment taken along the VII-VII line illustrated in FIG. 6. FIG. 8 is a cross sectional view of light projection lens 130 according to the embodiment taken along the VIII-VIII line illustrated in FIG. 6.

Note that, although not illustrated, the center of light source 120 and the center of light projection lens 130 which is illustrated in FIG. 6 through FIG. 8 overlap each other when seen from the top of light projection lens 130. That is, the center of light source 120 and the center of light projection lens 130 are disposed such that the optical axis of light 300 which is emitted from light source 120 passes through the center of light projection lens 130 (the center of inner surface 131 and the center of outer surface 132). In addition, the optical axis of light source 120 and the optical axis of light projection lens 130 overlap each other, and are parallel to the Z-axis.

As illustrated in FIG. 6, light projection lens 130 is a circular lens, for example. Note that the shape and the size of light projection lens 130 in the front view (that is, looking at a surface illustrated n FIG. 6) are not particularly limited. In this embodiment, the diameter of light projection lens 130 is 18 mm.

As illustrated in FIG. 7 and FIG. 8, light projection lens 130 has inner surface 131 and outer surface 132.

Inner surface 131 is a surface of light projection lens 130 which light 300 emitted from light source 120 enters.

Inner surface 131 includes first concave portion 133, second concave portion 134, diffusion portion 135, and level 136.

First concave portion 133 is a portion of inner surface 131 which is hollowed in the direction in which light 300 emitted from light source 120 enters.

In addition, as the broken line in FIG. 6 illustrates, in a cross section perpendicular to the optical axis of light 300 (the Z-axis direction in the embodiment) emitted from light source 120, first concave portion 133 has an elliptical shape. Note that the elliptical shape not only includes an oval shape, but also a round-cornered rectangle.

As illustrated in FIG. 7 and FIG. 8, a cross section parallel to the optical axis of light 300 emitted from light source 120, and a cross section perpendicular to the cross section have a difference in the radius of curvature in at least a portion of first concave portion 133 included in inner surface 131.

Light projection lens 130 is attached to mobile object 200 such that the lengthwise direction (the X-axis direction in the embodiment) of mobile object 200 coincides with the short axis direction of first concave portion 133 having the elliptical shape, and conversely, the widthwise direction (the Y-axis direction) of mobile object 200 coincides with the long axis direction of first concave portion 133 having the elliptical shape.

In addition, in a cross section of first concave portion 133 perpendicular to the optical axis of light 300 emitted from light source 120, a cross section taken along at a first position and a cross section taken along at a second position have a difference in the ratio of a short axis (the axis parallel to the X-axis in the embodiment) to a long axis (the axis parallel to the Y-axis in the embodiment) of the elliptical shape. The second position is different from the first position in the direction of the optical axis of light 300 emitted from light source 120.

Second concave portion 134 is a hollowed portion in inner surface 131 for providing a space for pins 162 such that terminal 160 is attached to substrate 140. Second concave portion 134 is formed in diffusion portion 135. More specifically, diffusion portion 135 includes second concave portion 134 hollowed in the direction in which light 300 emitted from light source 120 enters.

Diffusion portion 135 diffuses light 300 emitted from light source 120.

Figure 9:
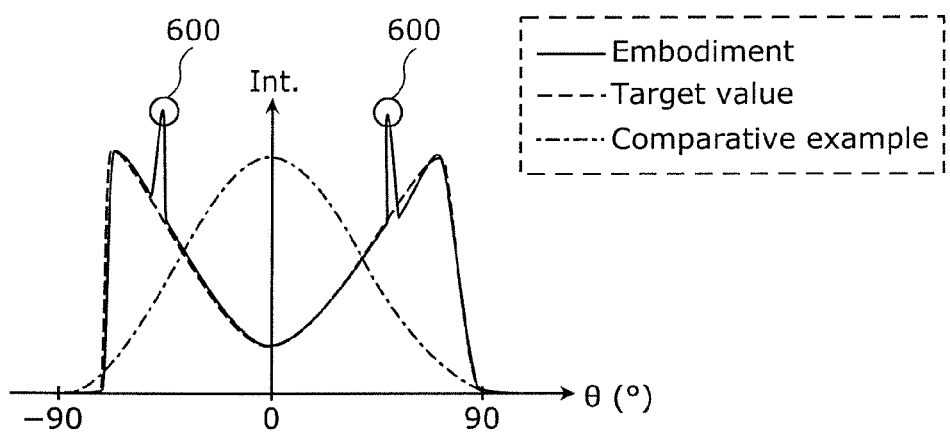
FIG. 9 is a diagram illustrating a light distribution characteristic of light which exits from the light projection lens according to the embodiment.

FIG. 9 is a diagram illustrating a light distribution characteristic of light 300 which exits from light projection lens 130 according to the embodiment. Note that, in FIG. 9, the horizontal axis represents a light distribution angle)(°, and the vertical axis represents the intensity of light (optional intensity). In addition, FIG. 9 illustrates, in a solid line, light distribution characteristics of light 300 which exits from light projection lens 130, and, in a dash-dot line, light distribution characteristics of light which exits from a lens according to Comparative example, such as a common convex lens and the like. In addition, FIG. 9 illustrates, in a broken line, target values which indicate light distribution characteristics to be targeted. Furthermore, Embodiment illustrated in FIG. 9 illustrates light distribution characteristics of light 300 in the Y-Z plane.

Light distribution characteristics of light source 120 that is used for Embodiment and Comparative example illustrated in FIG. 9 are as follows: (i) light has the maximum intensity when a light distribution angle is 0°; (ii) the light has at least 50% of the maximum intensity when the light distribution angle is from 60° to 70°; and (iii) the light has at least 5% of the maximum intensity when the light distribution angle is from 75° to 85°. For example, a ½ beam angle of light which light source 120 emits is 150°.

Light 300 which is emitted from light source 120 may have intensity of light that is uniform on a road surface where light 300 illuminates. For this reason, the intensity of light may decrease as the light distribution angle becomes closer to 0°, and the intensity of light may increase as the light distribution angle becomes closer to 90° or −90°, as the target values in FIG. 9 illustrate. With this, it is possible for light 300 to readily illuminate a road surface with the intensity of light that is uniform when the direction of the light distribution angle of 0° is equivalent to a direction that is perpendicular to the road surface, for example.

Here, in the case of the lens according to Comparative example, the intensity of light increases as a light distribution angle becomes closer to 0°, and the intensity of light decreases as the light distribution angle becomes closer to 90° or −90°. On such conditions, light emitted from the lens according to Comparative example is unable to illuminate a road surface with the intensity of light that is uniform at any angle.

On the contrary, according to Embodiment illustrated in FIG. 9, which is according to light projection lens 130, the intensity of light decreases as a light distribution angle becomes closer to 0°, and the intensity of light increases as the light distribution angle becomes closer to 90° or −90° as shown in Target value. Accordingly, the use of light projection lens 130 enables light 300 to readily illuminate a road surface with the intensity of light that is uniform when the direction of the light distribution angle of 0° is equivalent to a direction that is perpendicular to the road surface.

Note that, peak 600 appears near the light distribution angles of 60° and −60° in Embodiment as illustrated in FIG. 9. Peaks 600 are caused by light 300 emitted from light source 120 which enters, not from first concave portion 133, but from the peripheral portion of first concave portion 133 (diffusion portion 135 in the embodiment), and exits from outer surface 132.

The inventors of the present application have found that the intensity of light of peaks 600 can be reduced by using diffusion portion 135 having a light diffusible surface, instead of a flat surface having no light diffusibility.

Consequently, when seen from the optical axis direction of light 300 which is emitted from light source 120, inner surface 131 includes first concave portion 133 in the center portion, and diffusion portion 135 around first concave portion 133 for diffusing light 300 emitted from light source 120.

Figure 10:
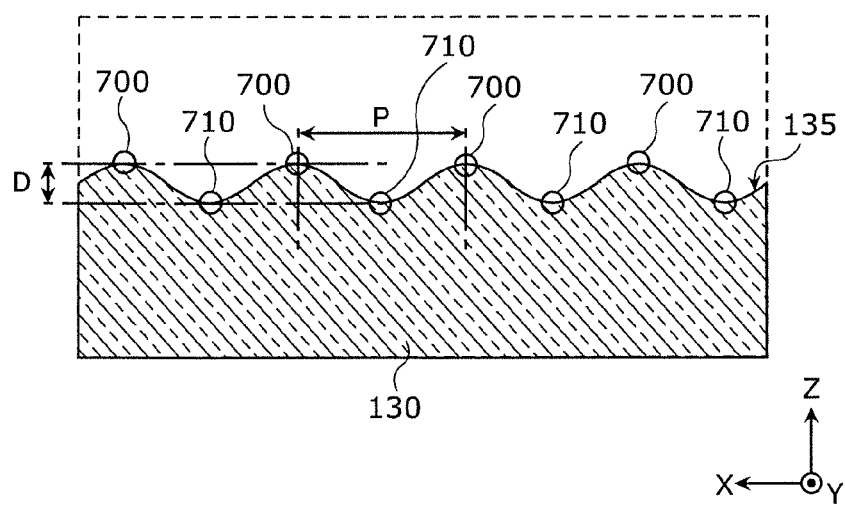
FIG. 10 is a partially enlarged cross sectional view of the light projection lens according to the embodiment where a portion enclosed with a broken line X in FIG. 8 is enlarged.

FIG. 10 is a partially enlarged cross sectional view of light projection lens 130 according to the embodiment where a portion enclosed with a broken line X in FIG. 8 is enlarged.

In a cross section parallel to the optical axis of light 300 emitted from light source 120, diffusion portion 135 has undulations, for example.

In addition, when seen from the optical axis direction of light 300 emitted from light source 120 (in this embodiment, when the X-Y plane is seen), diffusion portion 135 is annular so as to surround first concave portion 133. In addition, the undulations include apexes 700 which are concentric in diffusion portion 135. Similarly, the undulations include bottoms 710 which are concentric in diffusion portion 135.

Note that the size of an undulation is not particularly limited so long as light 300 can be diffused. Pitch P between apexes 700 is 0.5 mm, for example. In addition, depth D (from apex 700 to bottom 710) is 0.046 mm, for example. In addition, apex 700 and bottom 710 may be pointy or rounded. The radius of curvature of each apex 700 and bottom 710 is 0.3 mm in the embodiment.

In addition, substrate 140 and diffusion portion 135 are spaced apart as illustrated in FIG. 4. This is to reduce the area of contact between light projection lens 130 and substrate 140 to reduce the transmission of heat which light source 120 produces to light projection lens 130 via substrate 140. For this reason, light 300 emitted from light source 120 enters diffusion portion 135 rather than first concave portion 133. Consequently, diffusion portion 135 having light diffusibility can reduce the transmission of heat which light source 120 produces to light projection lens 130 via substrate 140, and can reduce the intensity of peak 600 illustrated in FIG. 9.

Note that the radius of curvature of a portion connecting diffusion portion 135 and first concave portion 133 may be small from a viewpoint on the light distribution characteristics. The radius of curvature of the portion connecting diffusion portion 135 and first concave portion 133 may be at most 0.05 mm, for example.

The embodiment will be described with reference to FIG. 7 once again. Level 136 is a portion which connects first concave portion 133 and diffusion portion 135. Level 136 is a portion which extends in the Z-axis direction from the edge of first concave portion 133, and connects with diffusion portion 135.

Outer surface 132 is a surface from which light 300 emitted by light source 120 that has entered inner surface 131 exits.

Outer surface 132 and first concave portion 133 have a difference in the radius of curvature in at least a portion of outer surface 132 and first concave portion 133 in a cross sectional view of a plane (a cross section illustrated in FIG. 7 or FIG. 8 in the embodiment) which includes the optical axis of light 300 emitted from light source 120. In other words, in a cross section parallel to light 300 emitted from light source 120, outer surface 132 and first concave portion 133 included in inner surface 131 have a difference in at least a portion of outer surface 132 and first concave portion 133 in the cross section parallel to the optical axis of light 300 emitted from light source 120. In this embodiment, outer surface 132 and first concave portion 133 have completely different radii of curvature in the plane which includes the optical axis of light 300 emitted from light source 120.

In addition, as Embodiment in FIG. 9 illustrates, light 300 that has exited from outer surface 132 is lesser in amount in the optical axis direction of light 300 (light distribution angle of 0°) emitted from light source 120 than in a direction different from the optical axis direction of light 300 (for example, in a direction greater or less than the light distribution angle of 0°).

For example, as illustrated in FIG. 7, the difference in the radius of curvature between a portion of inner surface 131 (more specifically, first concave portion 133) and a portion of outer surface 132 through which first optical path 310 passes is greater than the difference in the radius of curvature between a portion of inner surface 131 (more specifically, first concave portion 133) and a portion of outer surface 132 through which second optical path 320 passes. First optical path 310 is an optical path in light projection lens 130 through which light 300 emitted from light source 120 passes, and second optical path 320 is an optical path in light projection lens 130 through which light 300 emitted from light source 120 passes, and is closer to the periphery of light projection lens 130 than first optical path 310 is. In other words, in a cross section of light projection lens 130 (cross section illustrated in FIG. 7 in this embodiment) which is perpendicular to the short axis direction of first concave portion 133 having an elliptical shape, the absolute value of a second derivative value of a virtual curve which corresponds to inner surface 131 (more specifically, first concave portion 133) is smaller in the peripheral portion of light projection lens 130 than in the center portion of light projection lens 130.

In the embodiment, the radius of curvature R of outer surface 132 is invariable at about 18 mm, but the radius of curvature of inner surface 131 varies according to a position. Thus, the difference in the radius of curvature between a portion of first concave portion 133 and a portion of outer surface 132 through which optical path 310, where light 300 emitted from light source 120 passes through, passes is greater than the difference in the radius of curvature between a portion of first concave portion 133 and a portion of outer surface 132 through which second optical path 320 passes, for example. In addition, the absolute value of a second derivative value of a virtual curve (specifically, the curve of first concave portion 133 illustrated in FIG. 7) which corresponds to first concave portion 133 is smaller in the peripheral portion of light projection lens 130 than in the center portion of light projection lens 130, for example. This allows light 300 which passes through the center portion of light projection lens 130 to be exited from light projection lens 130 more toward the outside, or in other words, away from the center portion of light projection lens 130 due to the refraction occurred in light projection lens 130, compared to light 300 which passes through the peripheral portion of light projection lens 130. [Effects, etc.]

As has been described above, light projection lens 130 includes: (i) inner surface 131 which light 300 emitted from light source 120 enters, and includes first concave portion 133 hollowed in a direction in which light 300 emitted from light source 120 enters; and (ii) outer surface 132 from which light 300 that has entered inner surface 131 exits. In a cross section parallel to the optical axis of light 300 emitted from light source 120, outer surface 132 and first concave portion 133 included in inner surface 131 have a difference in the radius of curvature in at least a portion of outer surface 132 and first concave portion 133. In a cross section perpendicular to the optical axis of light 300 emitted from light source 120, first concave portion 133 has an elliptical shape. Light 300 which exits from outer surface 132 is lesser in the amount in the optical axis direction of light 300 emitted from light source 120 than in a direction different from the optical axis direction.

As illustrated in FIG. 9, the difference in the radius of curvature between inner surface 131 and outer surface 132 enables light 300 that has exited from outer surface 132 to be lesser in the amount in the optical axis direction of light 300 (light distribution angle of 0°) than in a direction different from the optical axis direction of light 300 (for example, in a direction greater or less than the light distribution angle of 0°). Accordingly, the use of light projection lens 130 enables light 300 emitted from light source 120 to have, on a spot on an illumination surface (for example, a road surface) where light 300 illuminates, a long shape and the intensity of light that is uniform.

In addition, for example, in a cross section of first concave portion 133 perpendicular to the optical axis of light 300 emitted from light source 120, a cross section taken along at a first position and a cross section taken along at a second position have a difference in the ratio of the short axis to the long axis of the elliptical shape. The second position is different from the first position in the optical axis direction of light 300 emitted from light source 120.

With this, the direction of light 300 which exits from outer surface 132 will be different according to a position in inner surface 131 where light 300 which light source 120 emits enters. Accordingly, it is possible to realize light projection lens 130 which can decrease the intensity of light as a light distribution angle decreases, and increase the intensity of light as the light distribution angle increases by appropriately setting the proportion of the short axis and the long axis of the elliptical shape.

In addition, for example, a difference in the radius of curvature between a portion of inner surface 131 and a portion of outer surface 132 through which first optical path 310 passes is greater than a difference in the radius of curvature between a portion of inner surface 131 and a portion of outer surface 132 through which second optical path 320 passes. First optical path 310 is an optical path in light projection lens 130 through which the light emitted from light source 120 passes, and second optical path 320 is an optical path in light projection lens 130 through which the light emitted from light source 120 passes, and is closer to the periphery of light projection lens 130 than first optical path 310 is.

With this, it is possible to realize light projection lens 130 which can decrease the intensity of light as a light distribution angle decreases, and increase the intensity of light as the light distribution angle increases.

In addition, for example, in a cross section of light projection lens 130 perpendicular to the short axis direction of first concave portion 133 having the elliptical shape, the absolute value of a second derivative value of a virtual curve corresponding to inner surface 131 is smaller in the peripheral portion of light projection lens 130 than in the center portion of light projection lens 130.

With this, it is possible to realize light projection lens 130 which can decrease the intensity of light as a light distribution angle decreases, and increase the intensity of light as the light distribution angle increases.

In addition, for example, when seen from the optical axis direction of light 300 emitted from light source 120, inner surface 131 includes: (i) first concave portion 133 in the center portion; and (ii) diffusion portion 135 which diffuses light 300 emitted from light source 120, around first concave portion 133.

With this, it is possible to reduce the intensity of peak 600 illustrated in FIG. 9 which appears when diffusion portion 135 does not have light diffusibility.

In addition, for example, in the cross section parallel to the optical axis of light 300 emitted from light source 120, diffusion portion 135 has undulations.

For example, if emboss processing is performed on diffusion portion 135, and thus diffusion portion 135 has light diffusibility (light scattering property), it is possible to reduce the intensity of peak 600. However, in such a case, a greater amount of light 300 emitted from light source 120 is reflected off diffusion portion 135.

On the other hand, the undulations of diffusion portion 135 can refract light 300 emitted from light source 120 and diffuse light 300. Accordingly, light 300 emitted from light source 120 can be readily exited from outer surface 132 without being reflected off diffusion portion 135.

In addition, for example, when seen from the optical axis direction of light 300 emitted from light source 120, diffusion portion 135 is annular so as to surround first concave portion 133. Furthermore, apexes 700 of the undulations are concentric in diffusion portion 135, for example.

Diffusion portion 135 which is annular so as to surround first concave portion 133 enables the intensity of light 300 which passes through diffusion portion 135 and exits from outer surface 132 to be more uniform. Apexes 700 which are concentric in diffusion portion 135 enable light 300 which enters diffusion portion 135 to be diffused by many portions. Accordingly, it is possible to diffuse a greater amount of light 300.

In addition, for example, diffusion portion 135 includes second concave portion 134 hollowed in the direction in which light 300 emitted from light source 120 enters.

With this, even when a structure, such as pin 162, which protrudes from substrate 140 to the light projection lens 130-side is disposed, the structure can be disposed in a space formed in second concave portion 134. Accordingly, the whole device, such as light source unit 100 which includes light projection lens 130, can be downsized.

In addition, for example, light projection lens 130 has light transmissivity which allows passage of infrared light, and does not allow passage of visible light.

With this, light projection lens 130 allows passage of light 300 emitted from light source 120, but does not allow passage of ambient light in the visible range from outside, such as sunlight, when light source 120 is a light source which emits infrared light, for example. This makes it difficult to visually check the inside of light source unit 100 which includes light source 120 and substrate 140, thereby improving the appearance of light source unit 100.

In addition, mobile object 200 according to the embodiment includes: light source 120 which emits infrared light; light projection lens 130 which covers light source 120, and includes: (i) inner surface 131 which the infrared light emitted from light source 120 enters; and (ii) outer surface 132 from which the infrared light exits; and a camera capable of detecting the infrared light that has exited from light projection lens 130.

Accordingly, the use of light projection lens 130 enables light 300 which is emitted from light source 120 to have, on a spot on an illumination surface (for example, a road surface) where light 300 illuminates, a long shape and the intensity of light that is uniform. With this, a road surface alongside mobile object 200 is appropriately illuminated with light 300 which light source 120 emits, thereby enabling camera 190 to capture an image of a spot in the road surface where light 300 illuminates.

In addition, for example, mobile object 200 has an elongated shape in a top view. Furthermore, light projection lens 130 is attached to mobile object 200 such that the lengthwise direction of mobile object 200 coincides with the short axis direction of first concave portion 133 having the elliptical shape, and the widthwise direction of mobile object 200 coincides with the long axis direction of first concave portion 133 having the elliptical shape, for example.

With this, it is possible for light projection lens 130 to emit light 300 which illuminates spot 410 that is long in the lengthwise direction relative to the widthwise direction of mobile object 200.

In addition, for example, light source 120 and light projection lens 130 are attached to mobile object 200 such that the optical axis of light 300 which exits from light projection lens 130 is directed toward the rear of mobile object 200.

Light source 120 and light projection lens 130 are attached to each of the two side-view mirrors 210 of mobile object 200, for example. The two side-view mirrors 210 are typically disposed near the front part of mobile object 200. Light source 120 and light projection lens 130 which are attached to mobile object 200 such that the optical axis of light 300 which exits from light projection lens 130 directs toward the rear of mobile object 200 to enable light 300 to illuminate the entire road surface alongside mobile object 200.

In addition, for example, light source 120 and light projection lens 130 are attached to mobile object 200 such that the optical axis of light 300 which exits from light projection lens 130 is directed away from mobile object 200.

With this, it is possible to reduce the loss of light 300 emitted from light source 120 due to light 300 striking mobile object 200.

In addition, for example, mobile object 200 further includes case 110 which supports light projection lens 130. Mobile object 200 includes light projection lens 130 and case 110 which are provided on each of the two sides of mobile object 200, for example. Furthermore, in a top view of mobile object 200, the two cases 110 (for example, case 110 and case 110a illustrated in FIG. 5) are asymmetrically disposed relative to imaginary line 500 which passes through the center of mobile object 200 and is parallel to a traveling direction of mobile object 200, for example.

Typically, when mobile object 200 is an automobile, the two side-view mirrors 210 incline differently relative to the traveling direction of mobile object 200. Since the two cases 110 each of which is provided on each of the two sides of mobile object 200 are asymmetrically arranged relative to imaginary line 500, the two cases 110 each can be suitably arranged in each of the two side-view mirrors 210.

In addition, for example, in the top view of mobile object 200, light projection lenses 130 are symmetrically disposed relative to imaginary line 500. Light projection lenses 130 each is provided on the each of the two sides of mobile object 200. As such, in the top view of mobile object 200, cases 110 and 110a are asymmetrically arranged on mobile object 200 relative to imaginary line 500, and light projection lenses 130 and 130a are symmetrically arranged on mobile object 200 relative to imaginary line 500 in this embodiment.

Accordingly, when mobile object 200 is an automobile, cases 110 and 110a each can be suitably disposed in each of the two side-view mirrors 210. In addition, like spots 410 illustrated in FIG. 2, each of light projection lenses 130 and 130a can emit light from light source 120 to illuminate each of the two sides of mobile object 200.

Other Embodiment

The above has described the light projection lens and the mobile object according to the embodiments, yet the present disclosure is not limited to the above embodiments.

For example, the above embodiments have described an LED chip as a specific example of light source 120, but a semiconductor light emitting element, such as a semiconductor laser, or a solid-state light emitting element, such as an organic electroluminescent (EL) element or an inorganic EL element, may be used as light source 120.

In addition, light source 120 may be realized as a surface mount device (SMD)-type LED module, or the so-called chip on board (COB) LED in which an LED chip is directly mounted on a board.

The present disclosure also encompasses: embodiments achieved by applying various modifications conceivable to those skilled in the art to each embodiment; and embodiments achieved by arbitrarily combining the structural elements and the functions of each embodiment without departing from the essence of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A light projection lens, comprising:
   an inner surface which light emitted from a light source enters, and includes a first concave portion hollowed in a direction in which the light emitted from the light source enters; and
   an outer surface from which the light that has entered the inner surface exits,
   wherein in a cross section parallel to an optical axis of the light emitted from the light source, the outer surface and the first concave portion included in the inner surface have a difference in radius of curvature in at least a portion of the outer surface and the first concave portion,
   in a cross section perpendicular to the optical axis of the light emitted from the light source, the first concave portion has an elliptical shape,
   in a cross-sectional view of a cross section of the light projection lens, which is taken along a long axis of the first concave portion having the elliptical shape when seen from the optical axis direction of the light projection lens, a second derivative value of a virtual curve expressed by $Z1=f(Y1)$ that corresponds to the first concave portion in the inner surface of the light projection lens
   (i) is a positive value in the center portion of the light projection lens and in a positive range of a Y1 axis, and
   (ii) monotonously decreases from the center portion of the light projection lens toward a peripheral portion of the light projection lens in the positive range of the Y1 axis, where the optical axis of the light projection lens is a Z1 axis, a direction from the outer surface of the light projection lens toward the inner surface of the light projection lens is a positive direction of the Z1 axis, a direction perpendicular to the Z1 axis is the Y1 axis, and a direction from the center portion of the light projection lens toward the peripheral portion of the light projection lens is a positive direction of the Y1 axis, and
   the light which exits from the outer surface is lesser in amount in an optical axis direction of the light emitted from the light source than in a direction different from the optical axis direction.

2. The light projection lens according to claim 1,
   wherein in a cross section of the first concave portion perpendicular to the optical axis of the light emitted from the light source, a cross section taken along at a first position and a cross section taken along at a second position have a difference in a ratio of a short axis to a long axis of the elliptical shape, the second position being different from the first position in the optical axis direction of the light emitted from the light source.

3. The light projection lens according to claim 1,
   wherein a difference in radius of curvature between a portion of the inner surface and a portion of the outer surface through which a first optical path passes is greater than a difference in radius of curvature between a portion of the inner surface and a portion of the outer surface through which a second optical path passes, the first optical path being an optical path in the light projection lens through which the light emitted from the light source passes, and the second optical path being an optical path in the light projection lens through which the light emitted from the light source passes, and being closer to a periphery of the light projection lens than the first optical path is.

4. The light projection lens according to claim 1,
   wherein when seen from the optical axis direction of the light emitted from the light source, the inner surface includes:
     the first concave portion in a center portion; and
     a diffusion portion which diffuses the light emitted from the light source, around the first concave portion.

5. The light projection lens according to claim 4,
   wherein in the cross section parallel to the optical axis of the light emitted from the light source, the diffusion portion has undulations.

6. The light projection lens according to claim 5,
   wherein when seen from the optical axis direction of the light emitted from the light source, the diffusion portion is annular to surround the first concave portion, and apexes of the undulations are concentric in the diffusion portion.

7. The light projection lens according to claim 4,
   wherein the diffusion portion includes a second concave portion hollowed in the direction in which the light emitted from the light source enters.

8. The light projection lens according to claim 1,
   wherein the light projection lens has light transmissivity which allows passage of infrared light, and does not allow passage of visible light.

9. A mobile object, comprising:
   the light source according to claim 1, which further emits infrared light;
   the light projection lens according to claim 1, which further covers the light source, and includes
     the inner surface which the infrared light emitted from the light source enters; and
     the outer surface from which the infrared light exits; and
   a camera detecting the infrared light that has exited from the light projection lens.

10. The mobile object according to claim 9,
    wherein the mobile object has an elongated shape in a top view, and
    the light projection lens is attached to the mobile object such that a lengthwise direction of the mobile object coincides with the short axis direction of the first concave portion having the elliptical shape, and a widthwise direction of the mobile object coincides with a long axis direction of the first concave portion having the elliptical shape.

11. The mobile object according to claim 9,
    wherein the light source and the light projection lens are attached to the mobile object such that an optical axis of the infrared light which exits from the light projection lens is directed toward rear of the mobile object.

12. The mobile object according to claim 9,
    wherein the light source and the light projection lens are attached to the mobile object such that the optical axis of the infrared light which exits from the light projection lens is directed away from the mobile object.

13. The mobile object according to claim 9, further comprising:
    a case which supports the light projection lens,
    wherein the light projection lens and the case are provided on each of two sides of the mobile object, and
    in a top view of the mobile object, the cases are asymmetrically disposed relative to an imaginary line which passes through a center of the mobile object and is parallel to a traveling direction of the mobile object.

14. The mobile object according to claim 13,
wherein in the top view of the mobile object, the light projection lenses are symmetrically disposed relative to the imaginary line, the light projection lenses each being provided on the each of the two sides of the mobile object.

\* \* \* \* \*